UNITED STATES PATENT OFFICE.

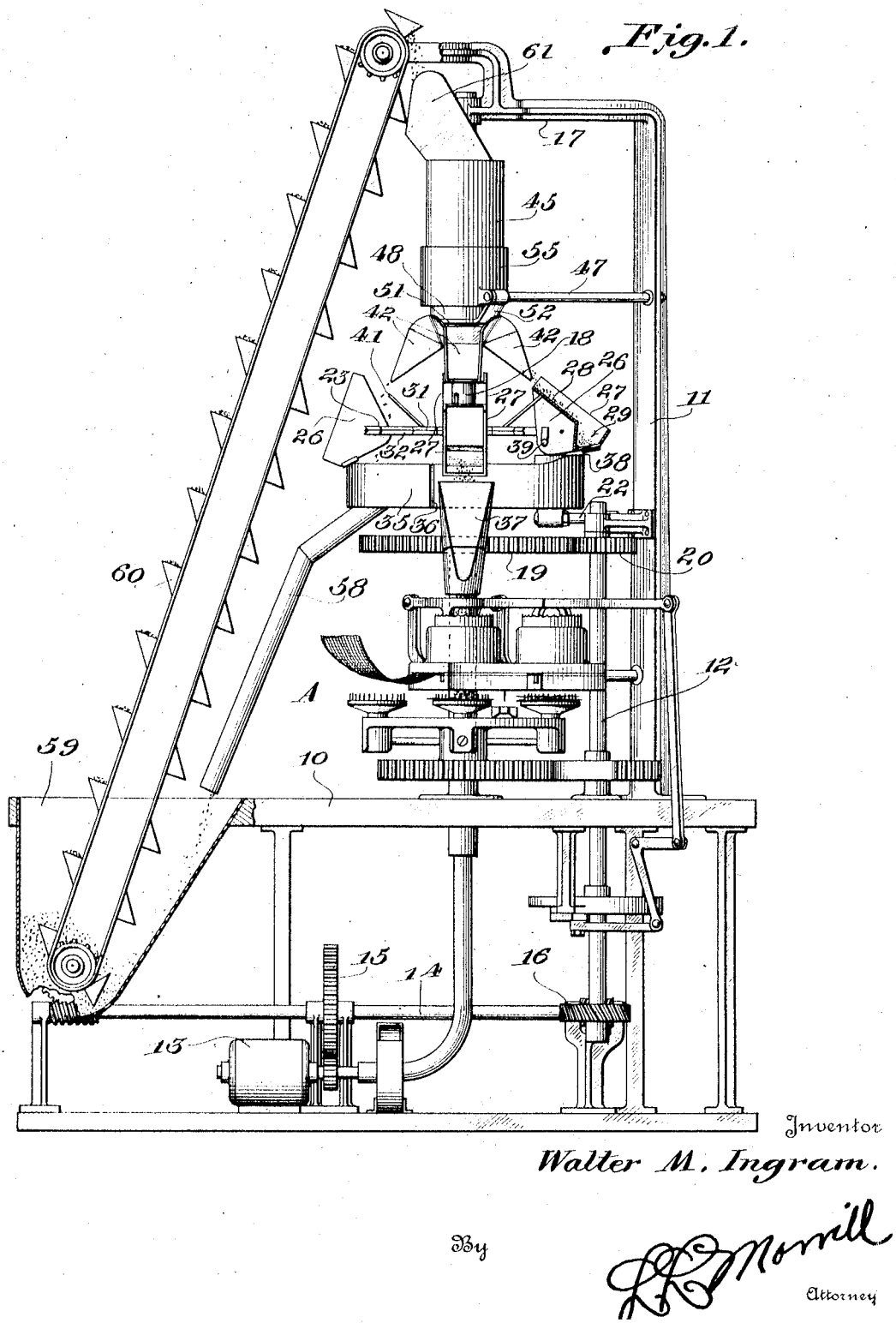

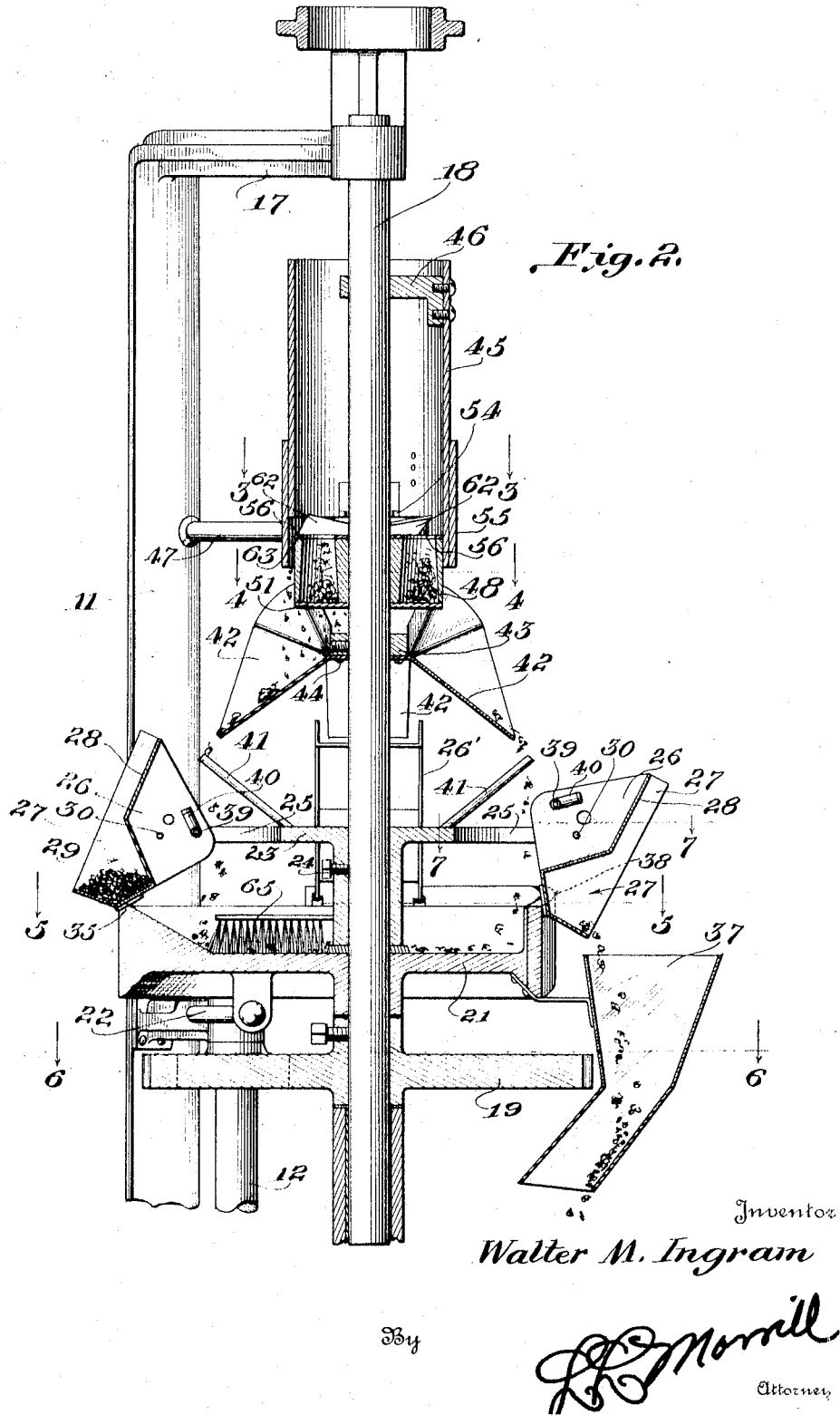

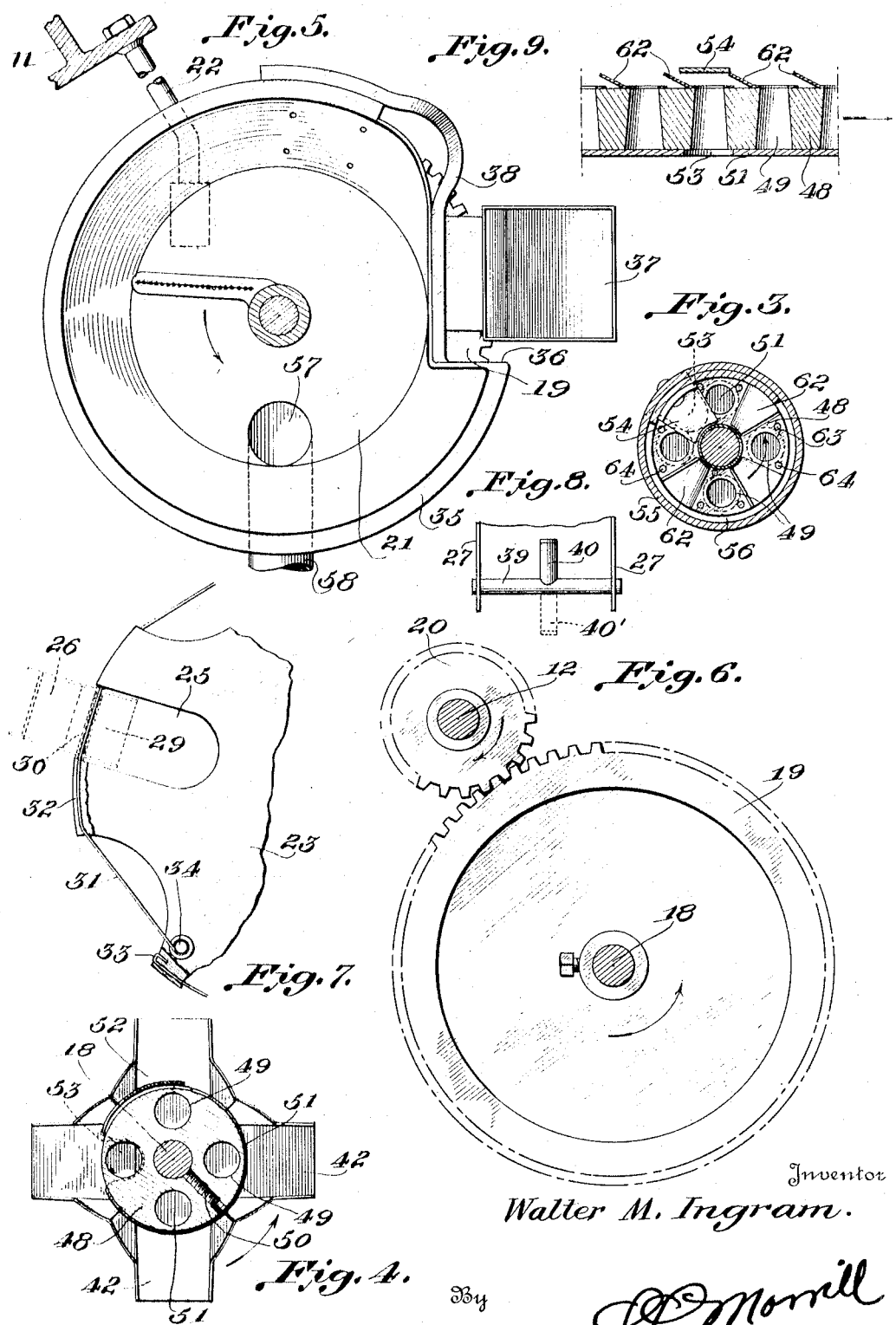

WALTER M. INGRAM, OF SUDBROOK PARK, MARYLAND, ASSIGNOR, BY DIRECT AND MESNE ASSIGNMENTS, TO THE SANITARY TEA BAGGING COMPANY, OF BALTIMORE, MARYLAND, A CORPORATION OF MARYLAND.

WEIGHING MACHINE.

Application filed September 19, 1924. Serial No. 738,638.

This invention relates to automatic weighing machines and has for an object to provide a machine especially adapted, though not limited, to weighing a large number of uniform small quantities of a commodity in a new and improved manner.

A further object of the invention is to provide a device especially, though not exclusively, adapted to the weighing of tea in small quantities for bagging in merchandise and culinary packages to be used as individual allotments for producing infusion either in a cup, tea pot or the like in a new and improved manner.

A further object of the invention is to provide an improved type of weighing machine having rotating or otherwise movable weighing units with means for discharging into one of the weighing units a quantity of the commodity less than the complete charge with provision for a dribble into said unit to complete the charge prior to its movement out of line of dribble.

A further object of the invention is to provide an improved type of weighing machine having hinged weighing units with adjustable balance members so suspended on a rotating turn table that in normal position they will receive successively the required amount of commodity from the charge and then swing upon their hinges out of receiving position to be later dumped successively in the continued rotation of the turn table.

A further object of the invention is to provide improved means for agitating the commodity so that it shall properly feed into the initial charge receptacle and to dribble into the units at later periods to prevent packing or clogging which would result from the use of certain commodities as for instance tea.

A further object of the invention is to provide improved means for continually charging the weighing device and returning to the charging mechanism the overflow from the dribble and other sources to be recharged in the continued operation of the device.

A further object of the invention is to provide a weighing machine properly constructed and proportioned to cooperate with the bagging machine which forms the subject matter of a co-pending application filed coincidentally herewith.

With these and other objects in view, the invention comprises certain novel parts, elements, units, combinations, constructions, interactions, mechanical movements and functions, as disclosed in the drawings together with mechanical and functional equivalents thereof, as will be hereinafter more fully described and claimed.

In the drawings:

Figure 1 is a view of the weighing device in side elevation, certain parts being broken away to show internal constructions.

Figure 2 is a sectional view substantially diametrically through the machine and taken on a plane at right angles to the view of Figure 1.

Figure 3 is a transverse sectional view through the agitating hopper taken on line 3—3 of Figure 2.

Figure 4 is a transverse sectional view through the charge measuring cylinder taken on line 4—4 of Figure 2.

Figure 5 is a top plan view of the stationary cam base as indicated by line 5—5 of Figure 2.

Figure 6 is a plan view of the operating gearing taken on line 6—6 of Figure 2.

Figure 7 is a fragmentary top plan view of the turn table showing the means of attaching the weighing units thereto as indicated by lines 7—7 of Figure 2.

Figure 8 is a plan view of the adjustable weight forming a part of each weighing unit.

Figure 9 is a diagrammatic view of the agitating device and charge forming cylinder illustrating the manner in which the contents of the agitating hopper is kept from packing and discharged through the charge forming cells.

Like characters of reference indicate corresponding parts throughout the several views.

The improved weighing machine which forms the subject matter of this application is intended and particularly, though not exclusively, adapted for use in conjunction with the bagging machine which forms the subject matter of a co-pending application filed coincidentally herewith and indicated in general by the character A at Figure 1.

The bagging machine has no relation to the automatic weighing machine forming the subject matter of this application except that both are driven from the same source to synchronize and each is intended to operate in conjunction with the other, using preferably the same deck 10 with a supporting upright 11 which support both the bagging machine and the weighing machine. Both are likewise driven from the shaft 12 which in turn is driven from any prime mover as the motor indicated conventionally at 13. As shown, the gearing, not intended as forming any limitation upon the present invention, comprises a shaft 14 intergeared with the armature of the motor 13 by the gearing 15 with other gearing as the worm gearing 16 for intergearing said shaft 14 with the shaft 12.

The upright 11 is provided with an offset 17 which serves to journal a shaft 18 which forms the means for driving the rotating parts of the device through the medium of a gear 19 intergeared with the pinion 20 upon the shaft 12.

Mounted upon the shaft 12 is a cam base 21 held against rotation by the brace 22 extended to and connected with the upright 11. Immediately above this cam base 21 is the turn table 23 secured to and rotating with the shaft as indicated by the set screw 24. This turn table 23 is provided with a plurality of slots or openings 25 within which are mounted a like number of weighing units indicated as an entirety at 26. These weighing units comprise side plates 27 connected by means of a sheet of material forming a normally inclined portion 28 and bent to form a pocket 29. The weighing units are pivoted to the turn table in any approved manner, but preferably by the use of tubes 30 inserted through perforations in the side plates 27 and suspended in the turn table by means of a wire 31 which passes entirely around the turn table, being located in grooves 32 in the perimeter of said turn table, one end being attached by means of a bent extremity 33 (see Fig. 7) and the whole wire tightened to maintain the several tubes in proper position by winding said wire about a tension pin 34.

The cam base is provided with a cam 35 uniform both in circumference and height throughout the greater portion of its periphery, normally tending to hold the weighing units at the positions shown at the left in Figures 1 and 2. It is provided with a cutaway portion 36 so positioned that as the turn table 23 rotates carrying the weighing units therewith sliding upon the top of said cam when said cutaway portion 30 is reached, the weight of the commodity in the pocket 29 serves to throw the weighing unit to the position shown at the right hand side at Figure 2, dumping the contents into the chute 37. The weighing unit just dumped comes in contact with a bulge 38 on said cam, which said bulge is directed outwardly and upwardly to raise the weighing unit from said dumped position to an upright or charge receiving position and to support it throughout a portion of its rotation in such position, as indicated by the weighing unit marked for identification 26' at Figure 2.

The weighing units are also provided with an adjustable weight which comprises a rod or tube 39 pivoted between the side plates 27 with an offset weighted member 40 which may be rotated about or with the shaft 39 to be located nearer to or farther from the pivot 30 of the weighing unit, such change of position being indicated at 40' in Figure 8.

It will be obvious that, as this weight 40 is nearer to or farther from the pivot 30, it will be a counter-balance of more or less resistance to the tilting of the weighing units.

To hold the weighing units in normal or charge receiving position, braces 41 are also provided, carried rigidly by the turn table with their ends in such position as to engage the under side of the inclined portion 28 carried by the weighing units.

For conducting the commodity to the weighing units, a plurality of chutes 42 are provided attached to a collar 43 rigidly attached to the shaft 18 in any approved manner, as by the set screw 44 and rotating with said shaft, so that each of the chutes 42 is continually in position to direct the commodity to or toward its individual weighing unit.

Above the chutes 42 is mounted an agitating hopper 45 having a brace 46 serving to position said hopper relative to the shaft 18 but all held against rotation with the shaft by a brace 47 extending to and connected with the upright 11. In the bottom of this agitating hopper 45 is mounted a charge forming cylinder 48 having a plurality of cells 49 formed therein, said cells being tapered, diverging downwardly so that the bottoms of said cells are of greater diameter than the tops. This charge forming cylinder rotates with the shaft 18, being secured thereto in any approved manner as by the set screw 50 (see Fig. 4). Beneath this charge forming cylinder is a disk 51 held against rotation by offset 52 which connects also with the brace 47. The charge forming cylinder 48, therefore, rotates in close relation to said disk 51 which is stationary and within the lower end of the agitating hopper 45. The plate 51 is provided with an opening 53 which is so positioned relative to the cam 35 that one of the cells of the charge forming cylinder 48 is brought over this opening 53 when a weighing unit is supported upon the bulge 38 of said cam.

This support at this point is for the purpose of preventing the tilting of the weighing unit by the impact of the commodity discharged from the registering cell through the particular chute into said weighing unit. There is also positioned in such relation a covering plate 54 supported by the hopper 45 so that, as the contents of the cell is dumped through the openings 53, commodity from the hopper 45 may not enter that particular cell. It is the intent that each of these cells shall receive from the hopper 45 a charge approximating the entire charge to be weighed, but slightly less than such entire charge. The hopper 45 is enlarged adjacent the charge forming cylinder in any approved manner as by applying a band 55 thereto which may be integral or rigid with the hopper 45 and in fact forms a part thereof, but which also provides an interval 56 about the periphery of said charge forming cylinder so that some of the commodity from the hopper 45 may continuously dribble through said interval into the several chutes 42 and be directed by said chutes into the weighing units until the amount so dribbled in shall overbalance the weighing unit when it tips to the position shown at the left in Figure 2, whereupon the dribble continues but is discharged upon the cam base 21. The cam base 21 is provided with an opening 57 which is in communication with a conduit 58 discharging into the main hopper 59. The hopper 59 is provided with a conveyor of any usual and ordinary type indicated at 60 which takes the commodity from said hopper and returns it to the agitating hopper 45 by means of dumping into a chute 61.

As hereinbefore stated, this particular weighing device is intended for the weighing of small charges of tea or similar commodity and for such commodity it has been found difficult to insure a feeding of the material as the material packs and clings and refuses to be fed into any charge forming device or other discharging means with any degree of uniformity. Such commodity is also subject to breakage, and it is desirable to prevent breakage to as great an extent as possible. For this purpose, an agitator of improved type has been provided in the present weighing machine which consists of fins 62 rigidly secured to and rotating with the charge forming cylinder 48. These fins may be constructed in any approved manner but are preferably formed as part of a plate 63, which is secured to the cylinder in any approved manner as by the rivets or screws 64. It is intended that the hopper 45 shall be fairly well filled with the commodity at all times and that the resistance offered by the friction of the commodity with said hopper, also the plate 54, will prevent said commodity from rotating with the charge forming cylinder 48 so that the material will be gently lifted by the inclined fins 62 and dropped over into position to fall into the several cells 49 without undue breakage.

At Figure 9 a conventional showing of the relation of the cylinder 48, plate 41, covering member 54 and fins 62 is shown. The cylinder will rotate in the direction indicated by the arrow at that figure, carrying the fins therewith so that, as these fins move under the commodity, it will drop over into the adjacent cell. The covering member 54, as will be noted, is located directly over the opening 53 in the disk 51 so that, when one of the cells is positioned over this opening, entrance to the cell is obstructed by the covering member 54. It will be understood, of course, that the commodity employed will not flow freely and will, therefore, not flow under this covering member 54.

As has been pointed out, the commodity contained in this cell which is dumped through the opening 53 is the approximate charge and is introduced into the weighing unit in the position shown at Figure 1, after which material continues to dribble as indicated at Figure 2 until the weighing unit has been overbalanced as shown at the left in Figure 2, whereupon the dribble will continue on to the cam base and will be moved about by the brush 65 until discharged through the opening 57 and chute 58.

It is believed that the operation of the improved automatic weighing machine has been completely and sufficiently described in the description of the several parts and their interactions so that further description of such operation would be superfluous.

What I claim to be new is:

1. An automatic weighing machine comprising a plurality of tiltable weighing units, means to discharge an approximate charge into one of said units, means to support said unit against tilting while receiving said charge and to release it after said charge is received, means providing a continued dribble into said unit until the charge has been completed, means to support the unit at a partly tilted position when such charge has been completed, means providing for the dumping tilting of said unit at one point in its movement, and means to receive the dumped charge.

2. A weighing machine comprising a rotating member, a plurality of tilting weighing units carried by said rotating member, means to support one of said units in a charge receiving position, means to introduce an approximate charge into said unit while so supported which said means releases the unit after receiving said charge, means to produce a continued dribble of commodity into said unit until the charge is completed, means to support said unit at a partly tilted position and prevent further dribble thereinto, and means providing for the complete dumping tilting of said unit at one point in its movement.

3. A weighing machine comprising a turn table having radially positioned slots, tilting weighing units fulcrumed in said slots, a cam positioned to support said units at various altitudes throughout the rotation of said turn table, and means provided in said cam to facilitate the dumping tilting of each unit successively as it reaches said point in its rotation.

4. A weighing machine comprising a turn table provided with a plurality of radially positioned slots, fulcrums positioned at the periphery of said turn table and spanning said slots, tiltable weighing units fulcrumed on said fulcrum members, a cam positioned relative to said weighing units varying in its supporting relation to at one period support a tilting unit wholly against tilting movement, at a second period to release said unit and permit a partial tilting, and at a third period to permit a complete dumping tilting of said unit.

5. A weighing machine comprising a turn table, a plurality of tilting weighing units fulcrumed on said turn table, a cam positioned relative to said units to at one period support one unit wholly against tilting, means to introduce an approximate charge of commodity into said unit when so supported, said cam at another period arranged to support the units at a partially tilted position, means to introduce a dribble of commodity into said units until the entire charge is introduced to tilt said unit to its partially tilted position and interrupt the introduction of dribble thereinto, said cam being further provided with means to facilitate the complete dumping tilting of a unit at one point in its movement.

6. A weighing machine comprising a turn table, a plurality of tilting weighing units fulcrumed in said turn table, a support for said tilting units varying in its supporting effect at different stages in the revolution of said turn table, means carried by each of said units for varying the weight of the charge required to tilt said unit, means to introduce an approximate charge into one unit while wholly supported by the supporting member, means to introduce a continued dribble into the units while unsupported, said supporting member providing means for preventing a complete dumping tilting of said units when the dribble completes a tilting charge and with further means for facilitating the complete dumping of said unit at a predetermined point in the rotation of said units and to return said discharged unit to charge receiving position.

7. A weighing machine comprising a turn table, a plurality of weighing units carried by said turn table, a plurality of chutes directed toward said units and rotating therewith, an agitating hopper, a charge forming cylinder rotating with said chutes in the bottom of said hopper and provided with a plurality of charge receiving cells located above said chutes, a valve adapted to close the bottoms of said cells and providing an opening for one cell successively, and a plurality of fins carried by said cylinder properly proportioned and adapted to lift the commodity in said hopper and drop it into proper filling relation to said cells.

8. A weighing machine comprising a turn table, a plurality of weighing units carried by said turn table, a plurality of chutes rotating with said turn table and directed toward said weighing units, a hopper, a charge forming cylinder located in the bottom of said hopper, and rotating with said chutes, said cylinder being provided with a plurality of charge receiving cells, one related to each of said chutes, a valve plate interposed between said cylinder and said chutes and provided with an opening adapted to release commodity from each of said cells successively, and a baffle located above said opening positioned to prevent the flow of commodity through the cell discharging through said opening.

9. In a weighing machine, a rotating weighing and commodity directing organization, a commodity hopper, a charge forming cylinder rotating with said organization in said hopper and provided with a plurality of charge receiving cells, a valve plate interposed between said cylinder and said organization and provided with an opening registering successively with each of said cells, a baffle located within the hopper above said opening and adapted and proportioned to prevent flow of commodity through the discharging cells, and means carried by said cylinder to lift the commodity in said hopper and drop it into proper filling relation to said cells.

10. A weighing machine comprising a rotating weighing and directing organization, a commodity hopper located above said rotating organization, a charge forming cylinder rotating with said organization in the bottom of said hopper, said cylinder being provided with a plurality of charge forming cells, means for discharging the contents of said cells successively into said directing and weighing organization, said cylinder being proportioned relative to said hopper to provide a continual dribble of commodity around the perimeter of said cylinder into said directing and weighing organization, and means within said cylinder to prevent flow of commodity through the discharging cell.

11. A weighing machine comprising a rotating weighing and directing organization, a charge forming cylinder having a plurality of cells, each positioned to discharge commodity into said directing and weighing organization, a valve positioned to close said cells and discharge said cells successively, a hopper positioned to maintain a supply of commodity above said cells, and inclined fins rotating with said organization within said hopper properly proportioned and positioned to lift said commodity and drop it into filling relation to said cells.

12. In a weighing machine, a weighing unit comprising spaced plates, a sheet of material interposed between and connecting said plates bent to form at one end a commodity receiving pocket and at its opposite end to form an inclination directed toward said pocket, an adjustable weight interposed between said plates in the rear of said sheet, and means to fulcrum said unit.

13. In a weighing machine, a weighing unit comprising spaced plates, means interposed between and connecting the plates to form a pocket at an inclination directed toward said pocket, a tube inserted through said plates, a moving member provided with a slot proportioned to receive said tube, a wire extending along the edge of said moving member and through said tube, and means to tauten said wire.

14. In a weighing machine, a turn table provided with a plurality of slots, weighing units interposed within the slots, a tube spanning the interval of each of said slots and forming a fulcrum for the weighing unit, a wire extending around said turn table and through the several tubes, and means to tauten the wire.

15. In a weighing machine, a turn table provided about its periphery with a groove and with slots substantially radially of said turn table, a wire extending about the periphery of said turn table and located in said groove and spanning the slots, a tension member carried by the turn table for tautening said wire, tubes disposed upon the wire spanning the slots, and tiltable weighing units fulcrumed upon said tubes.

In testimony whereof I affix my signature.

WALTER M. INGRAM.